United States Patent
Pandula

Patent Number: 5,299,236
Date of Patent: Mar. 29, 1994

[54] SYSTEM AND METHOD FOR OBTAINING AND MAINTAINING SYNCHRONIZATION OF A DEMODULATED SIGNAL

[75] Inventor: Louis Pandula, Sunnyvale, Calif.

[73] Assignee: Toshiba America Information Systems, Inc., Irvine, Calif.

[21] Appl. No.: 974,747

[22] Filed: Nov. 13, 1992

[51] Int. Cl.⁵ ............... H04L 7/00; H04L 27/06; H03D 1/00; H04J 3/06
[52] U.S. Cl. ................... 375/116; 375/114; 375/96; 370/106
[58] Field of Search ............... 375/111, 114, 115, 116, 375/1, 96; 371/47.1; 370/106, 107; 380/34

[56] References Cited

U.S. PATENT DOCUMENTS

| | | |
|---|---|---|
| 3,576,947 | 5/1971 | Kruger . |
| 3,736,507 | 5/1973 | Woleisza et al. . |
| 4,001,693 | 1/1977 | Stackhouse et al. . |
| 4,038,605 | 7/1977 | Elder et al. . |
| 4,039,749 | 8/1977 | Gordy et al. . |
| 4,164,628 | 8/1979 | Ward et al. . |
| 4,203,071 | 5/1980 | Bowles et al. . |
| 4,335,463 | 6/1982 | Foucard . |
| 4,353,130 | 10/1982 | Carasso et al. . |
| 4,435,826 | 3/1984 | Matsui ........................... 370/107 |
| 4,649,543 | 3/1987 | Levine . |
| 4,694,473 | 9/1987 | Etoh . |
| 4,701,939 | 10/1987 | Stutt et al. . |
| 4,766,602 | 8/1988 | Wilkinson et al. . |
| 4,823,362 | 4/1989 | Etoh . |
| 4,841,545 | 6/1989 | Endo et al. ........................ 380/34 |
| 4,903,225 | 2/1990 | Brost . |
| 4,984,238 | 1/1991 | Watanabe et al. ............... 375/116 |
| 5,007,088 | 4/1991 | Ooi et al. . |
| 5,062,122 | 10/1991 | Pham et al. ........................ 380/34 |
| 5,199,050 | 3/1993 | Linsky ............................. 375/115 |

OTHER PUBLICATIONS

"Spread Spectrum Systems", 2nd ed., John Wiley & Sons, Inc., pp. 252-255, Copyright ©1984.

*Primary Examiner*—Curtis Kuntz
*Assistant Examiner*—Duane Kobayash
*Attorney, Agent, or Firm*—Banner, Birch, McKie & Beckett

[57] ABSTRACT

A system and method for obtaining and maintaining synchronization with an incoming signal prior to and during the transmission of data. Specifically, embodiments of the present invention contemplate that synchronization is obtained by searching for an initial portion of a pattern in an input signal. Once the pattern is detected, the pattern (and/or some mathematical derivation thereof) must subsequently be detected a predetermined number of times. Once synchronization has been obtained, a pattern is continually looked for in the input signal in order to maintain synchronization. The present invention maintains this synchronization even though data may be embedded within this input signal.

9 Claims, 6 Drawing Sheets

SYSTEM AND METHOD FOR OBTAINING AND MAINTAINING SYNCHRONIZATION OF A DEMODULATED SIGNAL

BACKGROUND OF THE INVENTION

I. Field of the Invention

The present invention relates to obtaining and maintaining synchronization with an incoming signal prior to and during the transmission of data. More specifically, the present invention relates to recognizing that a pattern within an incoming demodulated electromagnetic signal has repeated itself (or that some mathematical relationship thereof has been received) a specified number of times, indicating that synchronization has been achieved and that transmitted data is forthcoming. The present invention also more specifically relates to maintaining synchronization with the incoming demodulated signal while data, which is imbedded within the signal, is received.

II. Related Art

The ability to transmit and receive information using a wireless electromagnetic carrier (at, e.g., radio or microwave frequencies) has been known for many decades. A somewhat more recent development, though, is the ability to receive and process binary data using digital technology. One common way that this works in a wireless environment is that an electromagnetic "pattern" is transmitted representing a binary piece of data (i.e., a binary 1 or 0). This pattern transmission may utilize amplitude, frequency or phase modulation.

The constituent pieces of the pattern themselves represent binary values. Thus, a pattern representing several binary values are used to represent a single binary value of data. For example, receipt of the pattern "10111011" may represent the receipt of "011 as data, while its inverse, 1101000100" may represent receipt of "1. " Data is conveyed in this way because of noise and interference associated with wireless transmissions. Otherwise, it would be difficult to determine whether the receipt of a single binary value was data or just noise.

Information on the electromagnetic carrier is thus received as a stream of representative binary 1's and 0's. Each binary 1 or 0 is known as a "chip." Thus, the data being transmitted is in the form of a pattern of chips. It is desirable that a pattern representing a binary piece of data comprise a significant number of chips to reduce the chance that unwanted noise in the electromagnetic information is mistaken for transmitted data.

Applications utilizing the transmission of digital information have become very popular in recent years. One such application which has been getting widespread attention is wireless local area networks (wireless LAN's). This technology allows computers to exchange information with each other by transmitting this information as described above. The obvious advantage that wireless LAN's have over other LAN's is that wires are not needed to connect the computers together.

Because the airwaves are already very crowded and heavily used by a variety of technologies, it is difficult to assign a usable band of frequencies for use by wireless LAN'S. Consequently, spread-spectrum technology is often utilized. This technology (which was originally developed for military applications) allows an electromagnetic transmission to be spread throughout many different frequencies which are already assigned to such technologies as radio or microwave devices. Since spread spectrum signals have a low-power spectral density, they generate less interference to other devices tuned to the same frequency.

Spread spectrum technology and wireless LAN's are particularly applicable to notebook and other small portable computers, as these computers are typically purchased for mobility. However, because of their smaller size and dependency on batteries for power, it is important to minimize the amount of circuitry used in receiving the different frequencies. In addition, because of the competitive nature of the computer industry, it is also important that costs associated with spread spectrum devices associated with wireless LAN's be kept to a minimum.

As indicated above, noise and interference are a problem whenever information is transmitted by electromagnetic means. Because of this problem, two important issues must be resolved for data to be successfully received. The first is that the received information needs to be initially recognized as valid information as opposed to noise. This recognition of valid information is known as "synchronization." During this initial synchronization the information acts as a header to indicate that data is about to be received. The second issue is that once synchronization has been obtained, it must be maintained while data is transmitted. This typically involves maintaining alignment of the received information with a reference signal.

Of relevance to both these issues are two general methodologies for determining whether synchronization has been obtained as is being maintained. The first is to analyze the incoming information on the modulated electromagnetic carrier for synchronization purposes prior to converting the information into digital form. The second is to first demodulate the information (i.e., remove the information from the electromagnetic carrier), convert it into digital form and then analyze the digitized information. The advantage of the latter methodology is that it produces a more cost-effective and compact design. Unless stated otherwise, this is the methodology assumed in use in the discussions below.

Regarding the first issue of obtaining synchronization, as indicated above the transmitting source typically transmits a synchronizing header comprising some pre-determined pattern. The received transmission is compared with a reference code (also comprising the pre-determined pattern). A match of the received transmission and reference code indicates that the header has been received and that data is about to be transmitted. The longer the pattern, the less likely it will be mistaken for noise or interference.

Although a longer pattern is obviously preferable, the problem is that the number of components (and thus the size of the circuit) required to detect synchronization increases nearly exponentially as the length of the pattern increases. When dealing with size, cost and power consumption constraints as discussed above, use of a long pattern can quickly become uneconomical.

Consequently, what is needed is a scheme to utilize an adequately long pattern to minimize false detection while also keeping the size of the synchronization detecting circuitry to a minimum. In addition, the circuitry needs to work in an environment where the incoming electromagnetic information has been demodulated first.

Once the demodulated information from the electromagnetic carrier (hereafter referred to as the "input signal") has been synchronized, then data is received. As indicated above, maintaining synchronization of the input signal as data is received is the second important issue which must be resolved to successfully receive the data.

Also as indicated above, typical schemes for conveying data transmit patterns where each pattern represents a 1 or a 0. The patterns used to transmit data are usually (but not always) longer than ones used for obtaining synchronization. However, the mere comparison of a pattern used to transmit data with a reference code in the manner described above is insufficient for maintaining synchronization. This is because fine adjustments are typically made to realign the input signal. This requires determining whether the input signal is being transmitted too quickly or too slowly, which is not deducible from just a pattern comparison.

Schemes which utilize patterns of an input signal to maintain synchronization during data transmission consequently use a somewhat different approach from that used to initially obtain synchronization. One such scheme for maintaining data synchronization utilizes what is known as a delay lock loop. Although this scheme is conventionally used prior to demodulation, it is discussed below in conjunction with FIGS. 1A and 1B with regard to a binary post-demodulation environment.

Referring first to FIG. 1A, a diagram of a conventional delay lock loop is shown. In operation, an input register 102 receives an input signal via line 100. The input register 102 is divided into two sections (124 and 126), each of which contains a chip received from the input signal. The chips shown in input register 102 represent the chips that are in the input register 102 during a time period $t_c$.

It is contemplated, time period $t_c$ is the time between when a single chip is first detected (in a reference code presumed in substantial alignment with the input signal as discussed below) and the time that the next chip is subsequently detected. Thus, as shown in FIG. 1A, in roughly the first half of time period $t_c$, section 124 contains chip N while in the second half of that time period it contains chip N+1. Similarly, in the first half of time period $t_c$ section 126 contains chip N−1 while in the second half it contains chip N. Thus, section 124 can be said to contain a later-in-time portion of the input signal while section 126 can be said to contain an earlier-in-time portion. In time periods subsequent to $t_c$, input register 102 would contain chips N+2, N+3, etc.

A reference code is generated by a code generator (not shown) and transmitted via a line 104. This reference code comprises the same pattern of chips used to transmit the input signal. Thus, it is expected that the chips received by the input signal are the same as the chips of the reference code. In this example, chip N is transmitted by the reference code during time $t_c$.

During the time period $t_c$, whatever chips are in sections 124 and 126 are multiplied with chip N of the reference code. Specifically, the reference code is multiplied with the chip in section 124 using multiplier 108 and the reference code is also multiplied with the chip in section 126 using multiplier 110. Typically, multi-sampling would occur where several multiplications actually take place during the period $t_c$. Although 1's and 0's are actually multiplied, it is conceptually easier to envision 0's as −1's. Consequently, since [reference code chip] N×(input register chip) N=1, and [reference code chip]N×(N+1 or N−1) would have a 50—50 chance of equaling a 1 or a −1, then if the input signal is aligned with the reference code the number of 1's resulting from multipliers 108 and 110 should be about the same over a given period of time.

If, however, the input signal is not aligned (i.e., not synchronized) with the reference code, then during time period $t_c$, chip N will be located in either section 124 or section 126 of input register 102 for a longer period of time than in the other section. For example, if the input signal is running more slowly (i.e., it is "late") as compared with the reference code, then chip N will be located in section 124 for a longer period of time than in section 126. If multi-sampling is used within time $t_c$ (and also when subsequent time periods are looked at) then multiplier 108 will yield more 1's than multiplier 110 during this time period. Conversely, if the input signal is running more quickly (i.e., it is "early") as compared with the reference code, then multiplier 110 will yield more 1's than multiplier 108.

Another way of looking at this concept is now described with regard to FIG. 1B. Referring to FIG. 1B, the chips within input register 102 are shown aligned with each other and with the reference code during time period $t_c$. If the input signal is received too quickly with respect to the reference code, the input signal would "shift" to the right. Therefore, chip N of the reference code would be multiplied with chip N via the "early" part of the input signal (in section 126) more frequently than with chip N via the "late" part of the input signal (in section 124). Thus, more 1's would result from multiplier 110 than from multiplier 108. The greater the difference in 1's, the greater the misalignment.

Thus, the values of the multipliers can be used to determine the direction as well as the magnitude of any misalignment between the input signal and the reference code. However, because of the random nature of the products generated by multiplying N×−1) and N×(N+1) as discussed above, some scheme is also typically used to average or "smooth" out the results of multipliers 108 and 110 so that a more accurate assessment of the alignment situation can be determined. Such a scheme is explained with regard again to FIG. 1A.

Referring back to FIG. 1A, an adder 112 adds the values from multiplier 108 and multiplier 110. It is contemplated that the adder 112 yields a positive sign if the results of multiplier 108 are positive and a negative sign if the results of multiplier 110 are positive. In this way, a signed value is generated corresponding to whether the input signal is running earlier or later than the reference code.

An integrator 114 is then used to actually "smooth out" what would otherwise appear as "noisy" signals. Consequently, the integrator typically obtains its output value by sampling the input signal over many chips. The output of the integrator 114 thus indicates an average of both the direction and magnitude of misalignment of the input signal. This output is then typically used to adjust the rate of the reference code to bring it into alignment with the input signal so that synchronization can be maintained.

A problem arises with conventional delay lock loops in post-demodulation environments, however, when data is embedded in the input signal. This is because the data is embedded by inverting the pattern in which the signal is sent. In other words, a non-inverted pattern might be equivalent to a binary 0 while an inverted pattern might be equivalent to a binary 1. The effect of this is that the data affects the ability of the reference code to match the pattern of the input signal. More specifically, many of the chips in the input signal will no longer be the same as the corresponding chips in the reference code. Because of this, synchronization cannot be maintained due to changes in the pattern due to data.

Another problem with conventional delay lock loops is that the electromagnetic waves transmitting the data may be using phase modulation. The results of this is that the input signal may have been inverted during transmission. If that is the case, then any misalignment readings will also be inverted (i.e., a "late" input signal will be interpreted as an "early" one).

Consequently, what is needed is some scheme to detect the direction of a misalignment of an input signal with regard to a reference code regardless of whether data is embedded in the input signal, and regardless whether the input signal has been inverted due to phase modulation.

SUMMARY OF THE INVENTION

The present invention fulfills the needs discussed above by providing a system and method for detecting a pre-determined pattern in the chips of a demodulated input signal by comparing the chips of the input signal with a reference code. The reference code contains a portion of a pre-determined pattern used by the signal transmitting device to indicate that data is forthcoming. If chips in the input signal match the pattern portion in the reference code, then subsequent chips from the input signal (which may or may not be contiguous to the initially detected pattern portion) are examined for the same pattern portion or some mathematically derived pattern related thereto. Detection of some pre-determined number of pattern portion (or mathematically derived) matches indicates that the entire transmitted pattern has been received and that data transmission is forthcoming. By transmitting related pattern portions, the present invention effectively extends the length of a transmitted pattern without substantially increasing the circuitry of the pattern detecting mechanism.

Once the above-mentioned pattern has been received (and initial synchronization has been obtained), data is then transmitted embedded in the input signal. The present invention allows synchronization to be maintained during this phase by determining whether a chip in the input signal has been changed as a result of embedded data and adjusting for any resulting error in indication of misalignment direction. The rate of the reference code is then adjusted accordingly. Thus, the present invention allows synchronization to be maintained with an input signal during transmission of data regardless of whether data is embedded within the input signal.

Other embodiments of the present invention further contemplate that synchronization can also be maintained regardless of whether the input signal has been inverted due to phase modulation.

BRIEF DESCRIPTION OF THE DRAWINGS

Various objects, features, and attendant advantages of the present invention can be more fully appreciated as the same become better understood with reference to the following detailed description of the present invention when considered in connection with the accompanying drawings, in which.

DETAILED DESCRIPTION OF THE EMBODIMENT

The present invention relates to obtaining and maintaining synchronization with an incoming signal prior to and during the transmission of data. More specifically, the present invention relates to recognizing that a pattern within an incoming demodulated electromagnetic signal has repeated itself (or that some mathematical relationship thereof has been received) a specified number of times, indicating that synchronization has been achieved and that transmitted data is forthcoming. The present invention also more specifically relates to maintaining synchronization with the incoming demodulated signal while data, which is imbedded within the signal, is received.

Figure 2:
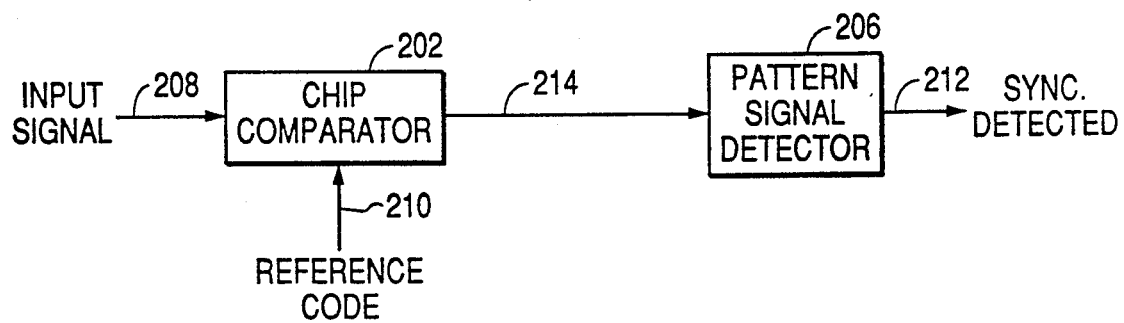
FIG. 2 is a high-level block diagram of embodiments contemplated by the present invention for obtaining synchronization.

Embodiments of the present invention for obtaining synchronization are now described with regard to FIG. 2. Referring to FIG. 2, an input signal is received via a line 208. As discussed above in the Background section, the input signal is comprised of "chips" derived from information from a demodulated electromagnetic carrier.

A chip comparator 202 compares the chips of the input signal with a reference code via a line 210. Both the chips of the input signal and of the reference code are being received at some given rate. This reference code is representative of a portion of an overall pre-defined digital pattern being looked for in the input signal. Ultimately, a match of this overall pattern indicates that synchronization has been achieved and that data is forthcoming.

Embodiments of the present invention contemplate that the reference code is generated by a code generator (not shown) which is contemplated to generate (or already contain) a pattern which is a portion of the overall pattern being looked for in the input signal. Some embodiments of the present invention contemplate that the overall pattern is a pseudo-random code.

If the chips received via the input signal in line 208 match the pattern (i.e., the pattern portion) received via line 210, then the chip comparator 202 sends a pattern signal via line 214 to a pattern signal detector 206. Embodiments of the present invention contemplate that the pattern signal detector 206 can be set to look for (i.e., count) any number of signals from the chip comparator 202 before the pattern signal detector 206 generates a synchronization signal via a line 212 indicating that synchronization has been detected. In other words, these embodiments contemplate that the pattern must be detected in the input signal a pre-determined number of times before the pattern signal detector 206 will send out a signal indicating that the overall pattern has been detected and that synchronization has been achieved. Extending the effective length of the overall pattern in this manner allows false detections as well as the amount of circuitry to be minimized.

The present invention also contemplates embodiments where after the chip comparator 202 indicates that a first pattern portion in the input signal was found, the subsequent pattern portion looked for is some mathematical derivative of the first pattern portion. For example, after detecting the first pattern portion, the chip comparator 202 may then be set to detect the inverse of the first pattern or the exclusive OR of the first pattern portion. Further, embodiments of the present invention contemplate that the match between the pattern of the input signal and the reference code may be within some pre-defined tolerance for there to be an indication from the chip comparator 202 that a pattern match has been detected. Also, embodiments of the present invention contemplate that the repetitive detections made by the pattern signal detector 206 must occur at predetermined intervals.

Thus, the present invention can detect a long overall pattern in an input signal by actually looking for two or more pattern portions. These pattern portions can be repetitions of the initial pattern portion or some mathematical derivative thereof.

Figure 3:
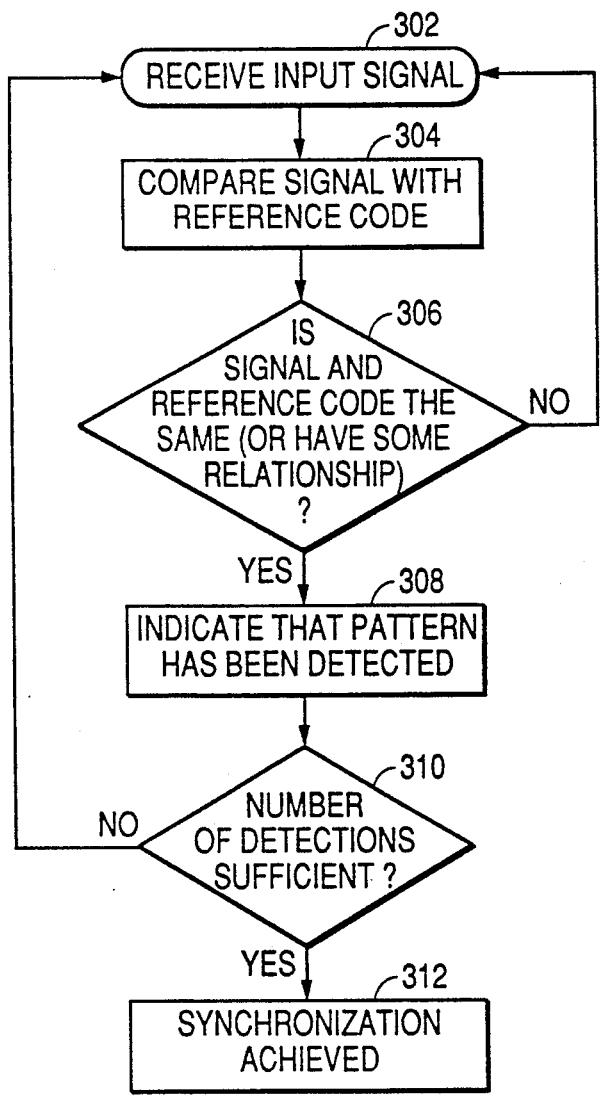
FIG. 3 is a flow diagram of a method contemplated by embodiments of the present invention for obtaining synchronization.

Embodiments of a method of operation of the present invention concerning obtaining synchronization are now described with regard to FIG. 3. Referring to FIG. 3, the first step is that an input signal is received, as indicated by a block 302. As indicated above, this input signal can comprise one or more binary chips. The input signal is then compared with the reference code, as indicated by block 304.

If a pattern in the input signal and the reference code (or some mathematical relationship derived therefrom) are not the same (or are not substantially the same) then the input signal will merely continue to be received as indicated by a decision block 306 and block 302. If, however, the input signal and the reference code are the same (or substantially the same or have some mathematical relationship) then an indication that the pattern has been detected will be generated as indicated by a block 308. Then, if the number of detections of the pattern (or the mathematical relationship derived therefrom) are sufficient, the entire overall pattern is found and synchronization is achieved as indicated by a decision block 310 and a block 312. If, however, the number of detections is not yet sufficient, then the input signal will continue to be received in search of a pattern to match the reference code, as indicated by decision block 310 and block 302.

Although embodiments of the present invention contemplate that the input signal is a demodulated signal derived from the digitization of a wireless electromagnetic wave form, it should be understood that other embodiments of the present invention contemplate operation in any other environment where the input signal is derived from some source where noise and interference exist.

Figure 4A:
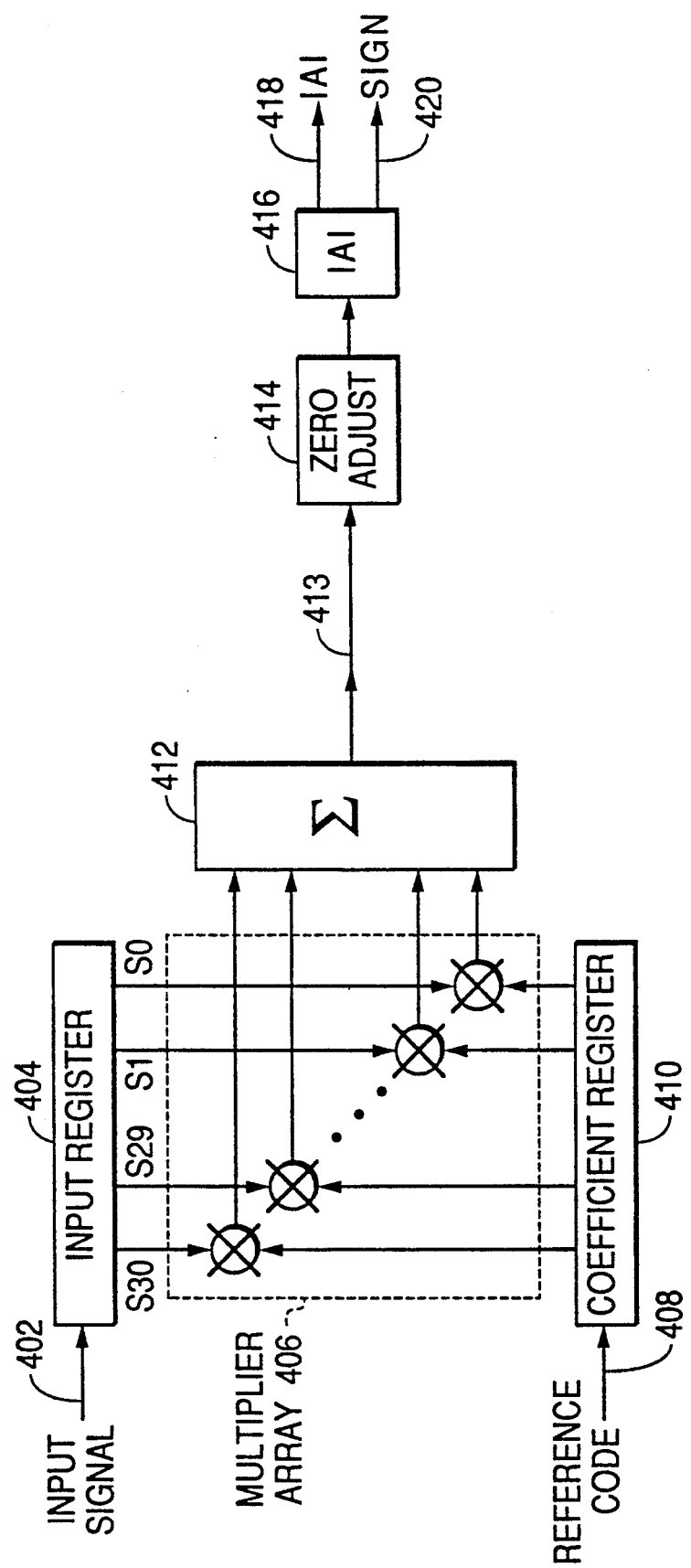
FIGS. 4A and 4B are block diagrams of embodiments contemplated by the present invention for obtaining synchronization.
Figure 4B:
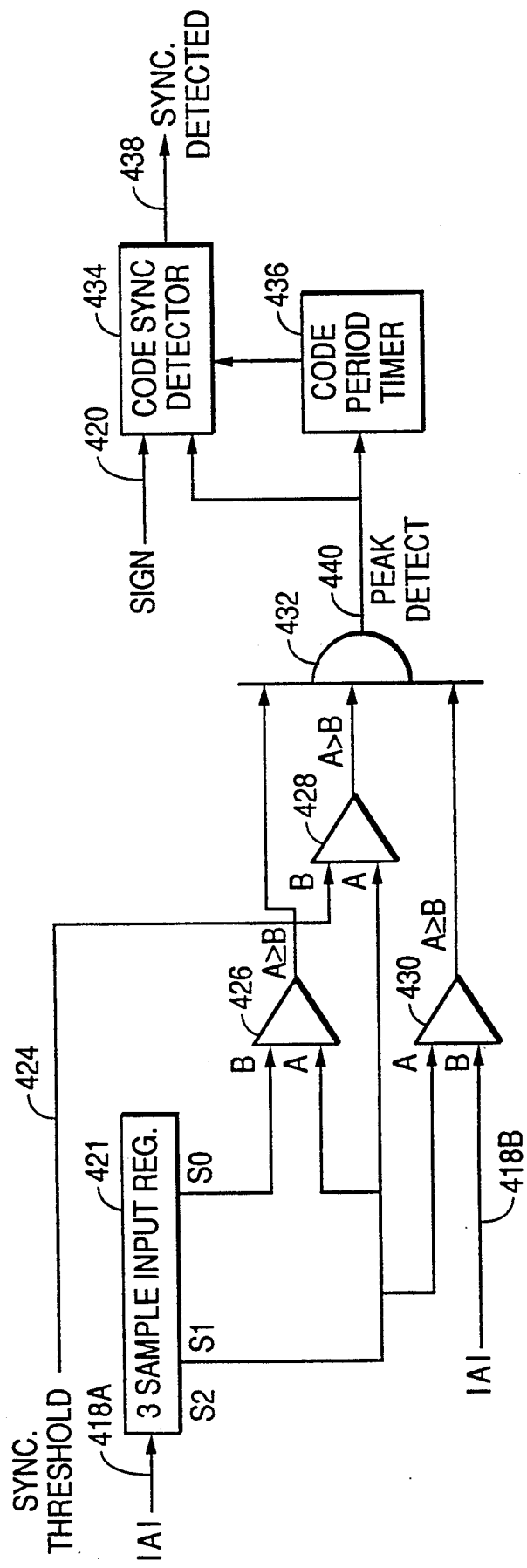

Some detailed embodiments envisioned by the present invention are now described with regard to FIGS. 4A and 4B. In these embodiments, it is contemplated that the initial pattern portion looked for in the input signal is 31 chips in length and that once this initial 31-chip pattern is detected, at least one pattern portion expected thereafter is the inverse of this initial pattern. Thus, the effective length of the overall pattern is at least 62 chips in length.

Referring now to FIG. 4A, the input signal is read into an input register 404 (which is 31 chips in length) via a line 402. Embodiments of the present invention contemplate that the input register 404 is a shift register comprising flip-flops, wherein the chips from line 402 are shifted in one chip at a time. That is, the present invention performs a comparison with the reference code (as described below) each time a new chip is shifted into the input register 404.

A reference code generator (not shown) is envisioned to contain (or generate) at least one of the patterns which is to be searched for in the input signal. A coefficient register 410 receives the reference code (comprising chips) via a line 408.

Each time a chip is shifted into input register 404, each chip residing in the input register 404 is multiplied with its corresponding chip in coefficient register 410 using a multiplier array 406 comprising a plurality of multipliers. Specifically, bit 0 of the input register 404 is multiplied with bit 0 of the coefficient register 410, etc. Some embodiments of the present invention contemplate that each multiplier in multiplier array 406 is a modulo 2 adder.

Once each of the chips is multiplied together as described above, the results of all these multiplications are summed by a summer 412. Embodiments of the present invention contemplate that this summer comprises full adders and half-adders.

The output of the summer 412 appears on line 413. The greater the number of matches between the chips of input register 404 and coefficient register 410, the greater the number that will appear at line 413. For example, if all of the chips matched, then the output on line 413 would be 31. If none of them matched, the output would be 0.

A zero adjust circuit 414 converts the value on line 413 from a unipolar value to a bipolar (i.e., "polarized") value. More specifically, the length of the input register 404 (which in this case is 31) is divided in half so that any value received from line 413 above the half-way mark (in this case, 15) is converted to a positive number (subtracted by 15), and values below the half-way mark are converted to negative numbers. For example, a value of 15 received via line 413 is converted to 0, a value of 17 is converted to +2, and a value of 12 is converted to −3. An absolute value converter 416 (designated |A|) then converts the polarized value obtained from the zero adjust circuit 414 into an absolute value (output at line 418) and the sign of the polarized value (output at line 420).

A description of the embodiments described above is continued with regard to FIG. 4B. Referring now to FIG. 4B, the absolute value output from absolute value converter 416 branches from line 418 to form lines 418A and 418B. Line 418A is received by a 3 sample input register 421. As with the input register 404, values are shifted into 3 sample input register 421 one chip at a time. Thus, each time a new chip is shifted into input register 404 and the above-mentioned operations take place to produce a new absolute value along line 418A, the new absolute value is shifted into 3 sample input register 421. The result is that 3 sample input register 421 contains not only the absolute value resulting from the latest above-mentioned operations, but it also contains the preceding two absolute values obtained from the preceding two operations. In addition, the absolute value from the current summation is also received by a comparator 430 via line 418B.

In seeking a pattern match, the purpose of the 3 sample input register 421 and associated circuitry is to recognize when the middle value in the 3 sample input register 421 is significantly larger than the other two. Specifically, when a match (or near match as explained below) occurs between input register 404 and coefficient register 410, the absolute value received via line 418 should be (or be close to) 15. On average, when the pattern in coefficient register 410, as a whole, does not match, then on average about half of the individual chips will match. In that situation, the absolute value transmitted at line 418 would be (or be close to) 0. Thus, by looking for such a "peak" in the middle value (i.e., at "S1") there is less possibility of a false synchronization detection.

Circuitry associated with some embodiments of the 3 sample input register 421 of the present invention is now described. To begin with, the current value shifted into the 3 sample input register 421 ("S2") is not sampled from this register 421. That is, only values "S0" and "S1" are sampled. Instead, the current value is used as an input to comparator 430 along line 418B. The other two values in 3 sample input register 421 (that is, S1 and S0) are received as inputs to comparators 426, 428 and 430. The results of these comparators are then input into an AND gate 432.

In essence, comparators 426, 428 and 430 along with AND gate 432 determine whether the second absolute value (Si) in 3 sample input register 421 has created a "peak" as compared with the first absolute value (SO) and the current absolute value to indicate that the pattern being looked for has, indeed, been detected. In some embodiments of the present invention, the synchronous threshold line 424 (which is an input of comparator 430) determines the magnitude that the "peak" must be for the AND gate 432 to output a signal indicating that the pattern has been found.

Once it has been determined that a peak has been detected, a peak detect signal is received along line 440 from the AND gate 432 by a code sync detector 434. The sign of the value transmitted from the zero adjust circuit 414 is also received via a line 420. The significance of this is that if the chips in input register 404 and coefficient register 410 match, then the sign received via line 420 is positive.

Thus, in embodiments contemplated in the present invention where a matching of the pattern is sought first and its inverse is then looked for, the sign received from line 420 will be positive upon detection of a match and a signal from line 440 will also be received. When this happens, a code period timer 436 is activated and counts down some pre-determined time period. At the end of this time period, the code sync detector 434 looks for a peak detection signal from line 440 and a negative signal from line 420. Embodiments of the present invention contemplate that this time period is equal to the time required for the input register 404 to shift in an entirely new pattern's-worth of chips (in the embodiments of FIG. 4B, this is the time required for the next 31 chips to be received by input register 404).

As indicated above, these embodiments contemplate that these next 31 chips should be the inverse of the initially matched pattern. If this is the case, none of the chips in input register 404 will match the pattern in coefficient register 404, and the result at line 413 will be approximately 0. Assuming the value is in fact 0, the zero adjust circuit 414 will adjust this value to −15. The absolute value converter 416 again outputs a +15 along line 418, but this time a negative indication is output along line 420. Thus, code sync detector 434 receives a peak detect signal from line 440 and a negative signal from line 420. Since this is what the code sync detector 434 is looking for, the code sync detector 434 outputs a synchronization detected signal along line 438 indicating that the overall pattern has been found.

If the code sync detector 434 does not receive the expected inputs in the designated amount of time, then it assumes that the first pattern match was just a false alarm and the present invention begins to look for the initial pattern again.

As indicated above, it should be understood that embodiments of the present invention contemplate that any number of mathematically related patterns could be looked for (one after the other or in some other fashion) and that the present invention is not limited to looking for the initial pattern and its inverse. Also, the present invention contemplates embodiments where the 3 sample input register 421 could be of other lengths and that the number of chips received via the input signal could have been counted rather than using code period timer 436. In addition, embodiments of the present invention contemplate that other circuits, circuit designs and configurations to perform the above-noted functions could also be used and are contemplated by various embodiments of the present invention.

Some embodiments of the present invention contemplate use in environments where the inverse of the initial pattern (as well as any mathematically related patterns thereafter expected) may be inverted due to phase modulation. In these embodiments, the present invention nonetheless recognizes the initial pattern from the input signal as a valid indication that data is forthcoming, and just assumes that all subsequently received patterns or mathematically related patters) will also be inverted. Also, some embodiments contemplate that above-described scheme for obtaining synchronization can be used in pre-demodulation environments as well.

Once synchronization is achieved, embodiments of the present invention contemplate use in environments where data is subsequently received via the input signal. It is envisioned that this data is received in the form of a pattern of chips as discussed in the Background section above. That is, receipt of a specified pattern might indicate a binary 0 and receipt of some mathematical representation thereof (e.g., inversion of the pattern) might represent a binary 1.

Figure 1A:
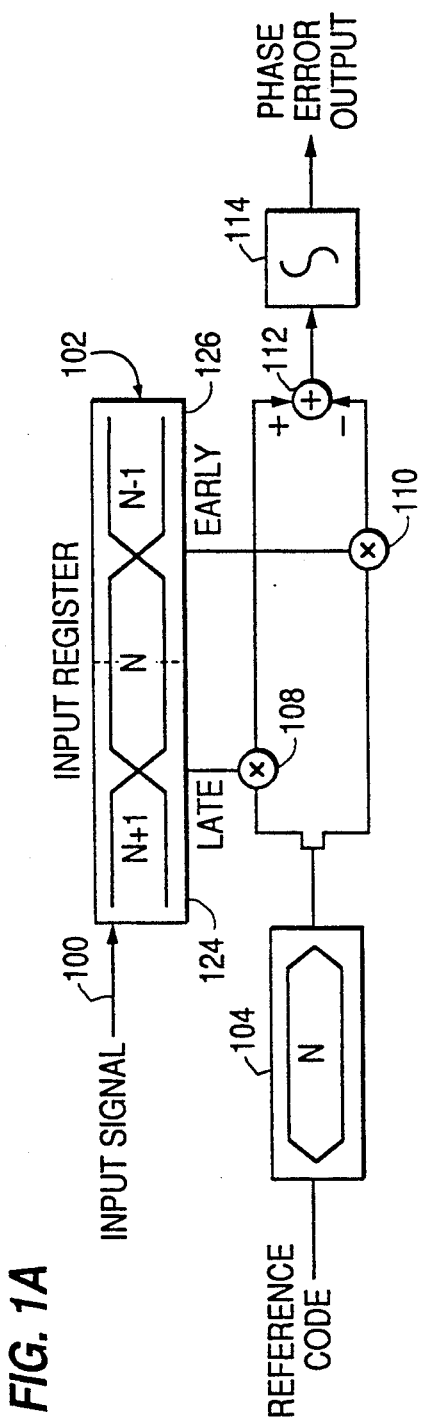
FIG. 1A is a diagram of a conventional delay lock loop.
Figure 1B:
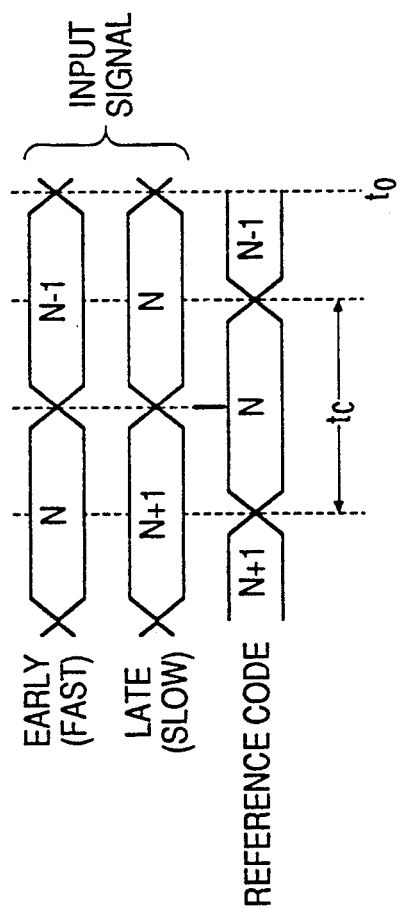
FIG. 1B is a timing diagram comparing an input signal with a reference code.
Figure 5:
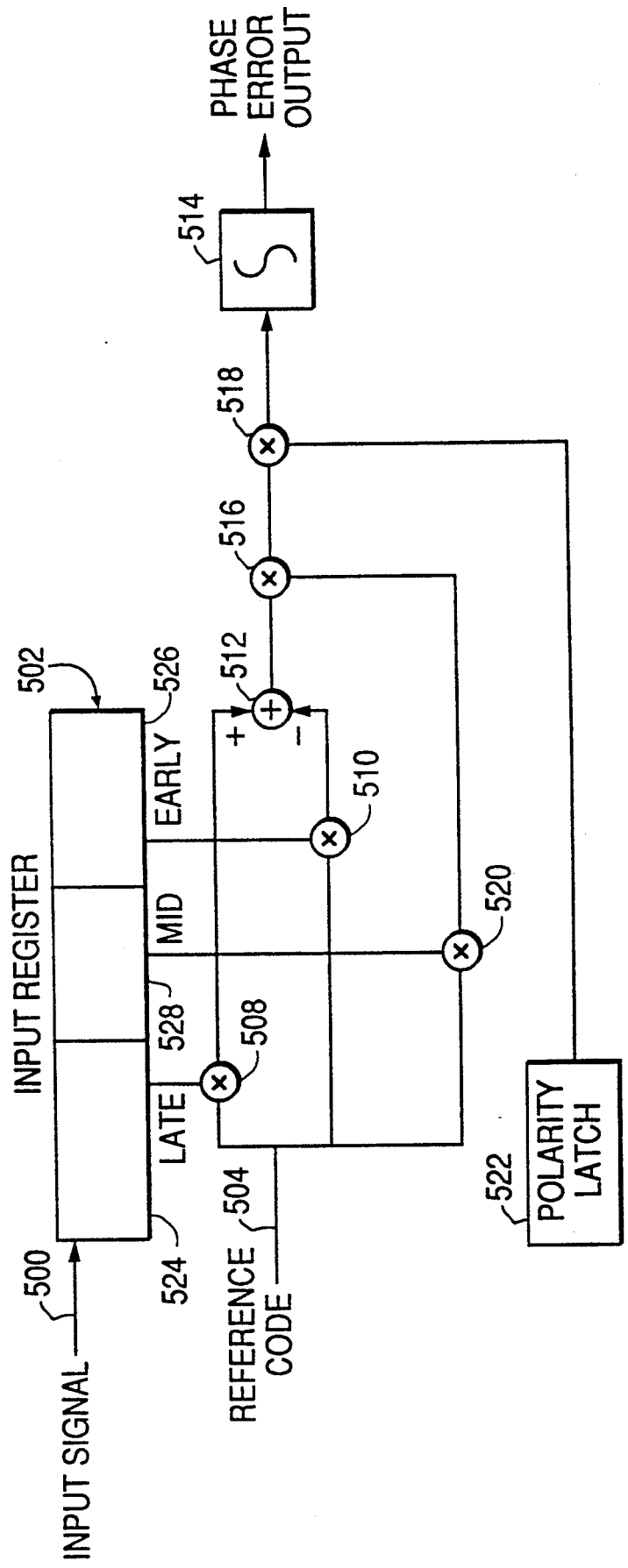
FIG. 5 is a block diagram contemplated by embodiments of the present invention for maintaining synchronization.

The way that embodiments of the present invention contemplate that synchronization is maintained using a pattern within the input signal with data embedded within the input signal is now described with regard to FIG. 5. Referring now to FIG. 5, the output of adder 512 and preceding circuitry works in the same way as described in the Background section above. Specifically, a section 524 of an input register 502 (containing a chip as shown in section 124 of FIG. 1A) is multiplied by the reference code via multiplier 508, while a section 526 of input register 502 (containing a chip as shown in section 126 of FIG. 1A) is multiplied by multiplier 510.

If the signal is shifted "late" then the results of adder 512 will be positive. If, however, signal is shifted "early" then the results of adder 512 will be negative. Thus, adder 512 generates a misalignment signal. Of course, the present invention contemplates modified designs to achieve the same basic function. In any event, as indicated above, these components alone are insufficient to maintain synchronization when data is embedded in the input signal.

To resolve the problem of maintaining synchronization during receipt of embedded data, embodiments of the present invention envision the existence of another section 528 of input register 502. This section 528 is contemplated to contain chip N itself during the time period $t_c$ as mentioned in the Background section. That is, the chip in section 528 and the chip of the reference code received via a line 504 at $t_c$ should be the same.

At approximately the middle of period $t_c$, some function is performed on the chip of section 528 of the input register 502 and the chip of the reference code received via line 504. The precise operation depends upon how the pattern of the input signal is affected when data is embedded. For example, if the pattern by itself represents a 0 and an XOR of the pattern represents a 1 (or vise versa), then the operation would be another XOR. Some embodiments of the present invention contemplate that an inversion of the pattern represents a 1. These latter embodiments are assumed during the discussion below.

For each chip appearing at section 528 during period $t_c$, a multiplier 520 multiplies the chip in section 528 with the chip received via line 504. If the two chips are identical, the result is a 1. If the two chips are different, then the result (which is 0) is treated as a $-1$. In essence, the two chips are compared for identity and the result is effectively a direction correction signal.

The result of the above-mentioned multiplication is then multiplied by the output of adder 512 using a multiplier 516. This multiplication causes the result of the adder 512 to reverse polarity. This consequently has the effect of canceling the effect that the embedded data has on determining the direction of the misalignment between the input signal and the reference code. Thus, the misalignment signal becomes a corrected misalignment signal.

Environments contemplated for use with the present invention contemplate that the data received via input signal is extracted for use using some device that is separate from the embodiments shown in FIG. 5.

Some embodiments of the present invention also contemplate that a polarity latch 522 is used to compensate for inverted results of adder 512 due to inversion of the pattern caused by phase modulation of the electromagnetic carrier. These embodiments contemplate that the polarity latch 522 receives some indication (such as, for example, line 420 of the embodiments of FIG. 4A for obtaining synchronization discussed above) of whether the entire input signal has been inverted. If it has, then the polarity latch generates a $-1$ which is then multiplied by the output of adder 512 using a multiplier 518.

The output of adder 512 (as possibly modified by multipliers 516 and 518) are then received by integrator 514 (which might be, for example, an "integrate and dump" type low pass filter) which "smooths" the results as discussed above so that the rate of the reference code can be adjusted to bring the reference code into alignment (i.e., maintain synchronization) with the input signal. Specifically, in the embodiments shown in FIG. 5, a positive error output from integrator 514 indicates that the rate of the reference code should be decreased and a negative error output indicates that the rate should be increased.

Figure 6:
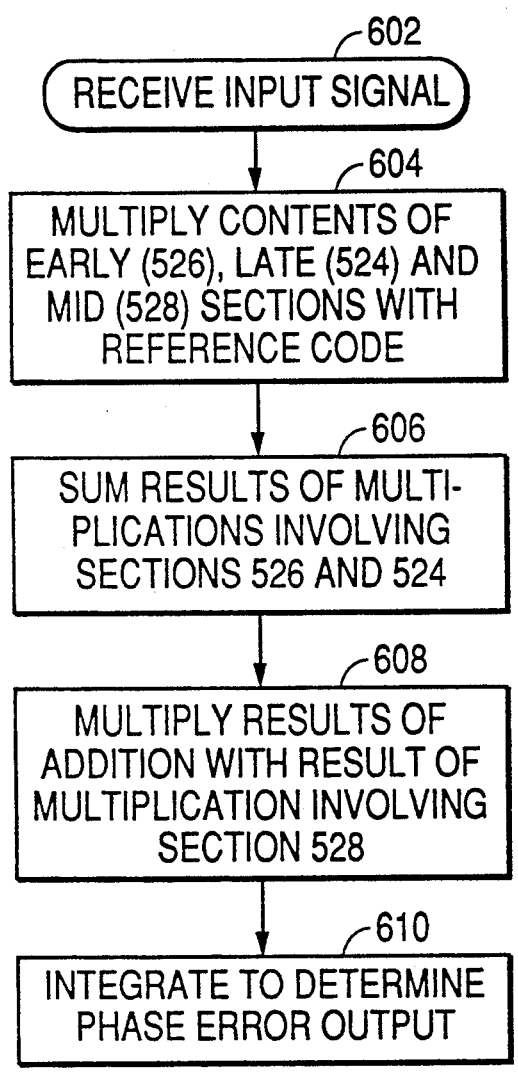
FIG. 6 is a flow diagram of a method contemplated by embodiments of the present invention for maintaining synchronization.

Operation of various embodiments of the present invention are now described with regard to FIG. 6. Referring now to FIG. 6, the first step is that an input signal is received, as indicated by a block 602. The next step is that the contents of the early (526), late (524) and reference (528) sections of input register 502 are multiplied with a corresponding portion of the reference code. This is indicated by a block 604.

The next step is to sum the results of the two multiplications involving sections 526 and 524. This is indicated by a block 606. This sum is then multiplied with the result of the multiplication involving section 528 and the reference code, as indicated by a block 608. The next step is to integrate to determine the magnitude and direction of any misalignment. This is indicated by a block 610.

It should be understood that in operating on various chips and other values located within the various registers mentioned above, embodiments of the present invention contemplate that over-sampling techniques are used. Also, various embodiments contemplate that storage other than registers (for example, RAM or some magnetic/optical media) could also be used in place of the registers or in place of any mechanism for storing values.

Some embodiments of the present invention contemplate that a "sample and hold" circuit is used to take a kind of "snapshot" of the output of multiplier 520. More specifically, this "snapshot" is taken at time $\frac{1}{2} t_c$. This allows for a more accurate reading of the chip in section 528 at time $t_c$.

Some embodiments of the present invention also contemplate that the reference code received via line 504 (as well as the corresponding pattern used to transmit data received via the input signal) is different (and longer) than the reference code received via line 210 or 408. Further, some embodiments envision use in environments where transmission of data is somewhat delayed after transmission of the pattern used to achieve initial synchronization and that several iterations of the pattern otherwise used to transmit data are sent without data embedded in them. This is to allow embodiments of the mechanism shown to FIG. 5 to adjust (i.e., lock on) to the receipt of the input signal. Some of these embodiments envision that 172 chips is sufficient to make this adjustment.

Although the embodiments discussed above concern the use of digital technology, it should be understood that embodiments of the present invention contemplate analogue equivalents where a demodulated (but undigitized) input signal is processed as described above.

It should be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It should also be understood that the present invention is not limited to the embodiments indicated above, and that the examples presented above are merely for the purposes of illustration. The scope of the present invention should therefore be interpreted by the following claims as defined by the forgoing figures and text.

What is claimed is:

1. A system for detecting an overall pattern in an input signal by detecting a first pattern portion and by subsequently detecting a second related pattern portion, comprising:

comparator means for comparing the input signal with a reference code for detecting when the input signal contains the first pattern portion, and for subsequently detecting when the input signal contains the second related pattern portion, said comparator means generating a first signal when a detection is observed and generating a second signal when a detection is not observed;

peak detector means, responsive to said comparator means, for generating a pattern signal when said second signal is received from said comparator means before and after receipt of said said first signal; and signal detector means, responsive to said peak detector means, for counting the number of said pattern signals generated from said peak detector means and for generating a synchronization signal when the number of said pattern signals equals a pre-defined amount of at least two.

2. The system of claim 1, wherein said signal detector means requires that said pattern signals be received at a predetermined interval for said pattern signals to be counted.

3. A system for indicating the direction of misalignment between an input signal and a reference code wherein data is embedded in the input signal, comprising:

input storage means for containing a portion of the input signal during a time period $t_c$, wherein said input storage means is divided into a first second and third section, wherein said first section receives a later-in-time portion of the input signal, said third section receives an earlier-in-time portion of the input signal and said second section receives a middle portion of said input signal;

misalignment indication means for comparing the input signal in said first section and said third section of said input storage means with the reference code during time period $t_c$ and for generating a misalignment signal indicating the existence of a misalignment between the input signal and the reference code;

comparison means for comparing the input signal in said middle portion with the reference code during time period $t_c$ and for generating a direction correction signal; and direction correction means for applying said direction correction signal to said misalignment signal to yield a corrected misalignment signal indicating the direction of the misalignment.

4. The system of claim 3, wherein said misalignment indication means and said comparison means utilize over-sampling techniques.

5. The system of claim 4, further comprising sample and hold means, responsive to the output of said comparison means, for obtaining said direction correction signal at a designated point in time within time period $t_c$.

6. The system of claim 3, wherein said input storage means is a register.

7. The system of claim 1, wherein said comparator means comprises pattern match means for comparing the input signal with said reference code and for generating said first signal upon detecting when the input signal contains the inverse of the first pattern portion.

8. A method for detecting an overall pattern in an input signal by detecting a first pattern portion and by subsequently detecting a second related pattern portion, comprising the steps of:

(a) comparing the input signal with a reference code for detecting when the input signal contains the first pattern portion, and subsequently detecting when the input signal contains the second related pattern portion, (b) generating, in response to said step (a), a first signal when a detection is observed and generating a second signal when a detection is not observed;

(c) generating a pattern signal when said second signal is generated before and after generation of said first signal by said step (b);

(d) counting the number of said pattern signals generated from said step (c); and (e) generating a synchronization signal when the number of said pattern signals equals a pre-defined amount of at least two.

9. A method for indicating the direction of misalignment between an input signal and a reference code wherein data is embedded in the input signal, comprising the steps of:

(a) dividing an input storage, containing a portion of the input signal during a time period $t_c$, into a first, second and third section, wherein said first section receives a later-in-time portion of the input signal, said third section receives an earlier-in-time portion of the input signal and said second section receives a middle portion of said input signal;

(b) comparing the input signal in said first section and said third section of said input storage means with the reference code during time period $t_c$ (c) generating a misalignment signal indicating the existence of a misalignment between the input signal and the reference code;

(d) comparing the input signal in said middle portion with the reference code during time period $t_c$ and generating a direction correction signal; and applying said direction correction signal to said misalignment signal to yield a corrected misalignment signal indicating the direction of the misalignment.

* * * * *